United States Patent
Liverman

(10) Patent No.: US 10,086,566 B2
(45) Date of Patent: Oct. 2, 2018

(54) APPARATUS FOR PRODUCTION OF THREE-DIMENSIONAL OBJECTS BY STEREOLITHOGRAPHY

(71) Applicant: Old World Labs, Norfolk, VA (US)

(72) Inventor: Nicholas Lee Liverman, Virginia Beach, VA (US)

(73) Assignee: OLD WORLD LABS, Norfolk, VA (US)

(*) Notice: Subject to any disclaimer, the term of this patent is extended or adjusted under 35 U.S.C. 154(b) by 510 days.

(21) Appl. No.: 14/588,553

(22) Filed: Jan. 2, 2015

(65) Prior Publication Data

US 2015/0183168 A1 Jul. 2, 2015

Related U.S. Application Data

(60) Provisional application No. 61/923,024, filed on Jan. 2, 2014.

(51) Int. Cl.
  *B29C 64/135* (2017.01)
  *B29C 67/00* (2017.01)
  *B29C 64/386* (2017.01)
  *B29K 71/00* (2006.01)
  *B33Y 10/00* (2015.01)
  *B33Y 30/00* (2015.01)
  *B33Y 50/02* (2015.01)

(52) U.S. Cl.
  CPC ........ *B29C 67/0088* (2013.01); *B29C 64/135* (2017.08); *B29C 64/386* (2017.08); *B29K 2071/02* (2013.01); *B33Y 10/00* (2014.12); *B33Y 30/00* (2014.12); *B33Y 50/02* (2014.12)

(58) Field of Classification Search
  CPC ... B29C 64/124; B29C 64/129; B29C 64/135; B29C 64/20; B29C 64/25; B29C 64/255; B29C 64/268; B29C 67/0062; B29C 67/0066; B29C 67/007; B29C 67/0085
  USPC ........................................... 264/401
  See application file for complete search history.

(56) References Cited

U.S. PATENT DOCUMENTS

| 4,575,330 | A | * | 3/1986 | Hull | ............... G03F 7/0037 156/58 |
| 5,009,585 | A | * | 4/1991 | Hirano | ............... B29C 64/135 118/500 |

(Continued)

FOREIGN PATENT DOCUMENTS

WO    WO-2012021940 A1 *  2/2012  ......... B29C 35/0805

*Primary Examiner* — Timothy Kennedy
(74) *Attorney, Agent, or Firm* — The Marbury Law Group, PLLC

(57) ABSTRACT

A system for making three dimensional objects. The system may have a frame, a build platform movably coupled to the frame, a vat removably secured so that the build platform may be lowered within the vat, and a movable radiation source capable of movement along an x and y-axis. The vat may have a radiation permeable flat bottom. The build platform may have a work surface disposed thereon. There may be at least one stepper motor capable of moving the radiation source, the build platform, or both the radiation source and the build platform. There may also be a power source, a data reader device and or computer communication device, and a microcontroller in communication with the at least one stepper motor and at least one of the data reader device or computer communication device.

18 Claims, 18 Drawing Sheets

(56) References Cited

U.S. PATENT DOCUMENTS

| | | | | |
|---|---|---|---|---|
| 5,248,456 A | * | 9/1993 | Evans, Jr. | B33Y 40/00 118/423 |
| 5,597,520 A | | 1/1997 | Smalley et al. | |
| 5,936,861 A | * | 8/1999 | Jang | B29C 70/384 700/98 |
| 2009/0020901 A1 | * | 1/2009 | Schillen | B29C 70/88 264/31 |
| 2013/0036409 A1 | * | 2/2013 | Auerbach | G06F 8/456 717/140 |
| 2013/0056910 A1 | * | 3/2013 | Houbertz-Krauss | B33Y 30/00 264/401 |
| 2013/0292862 A1 | * | 11/2013 | Joyce | B29C 67/0096 264/40.1 |

\* cited by examiner

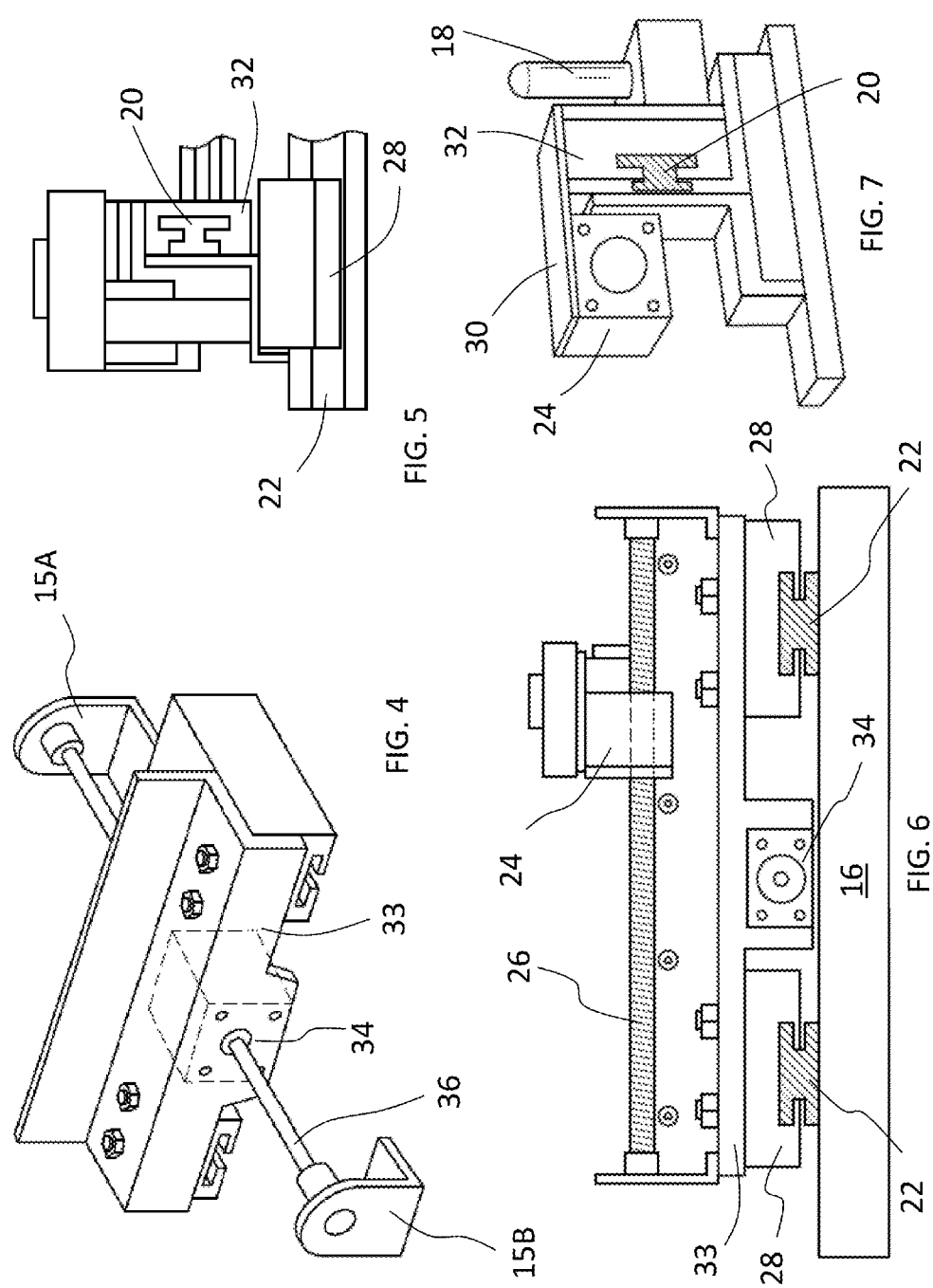

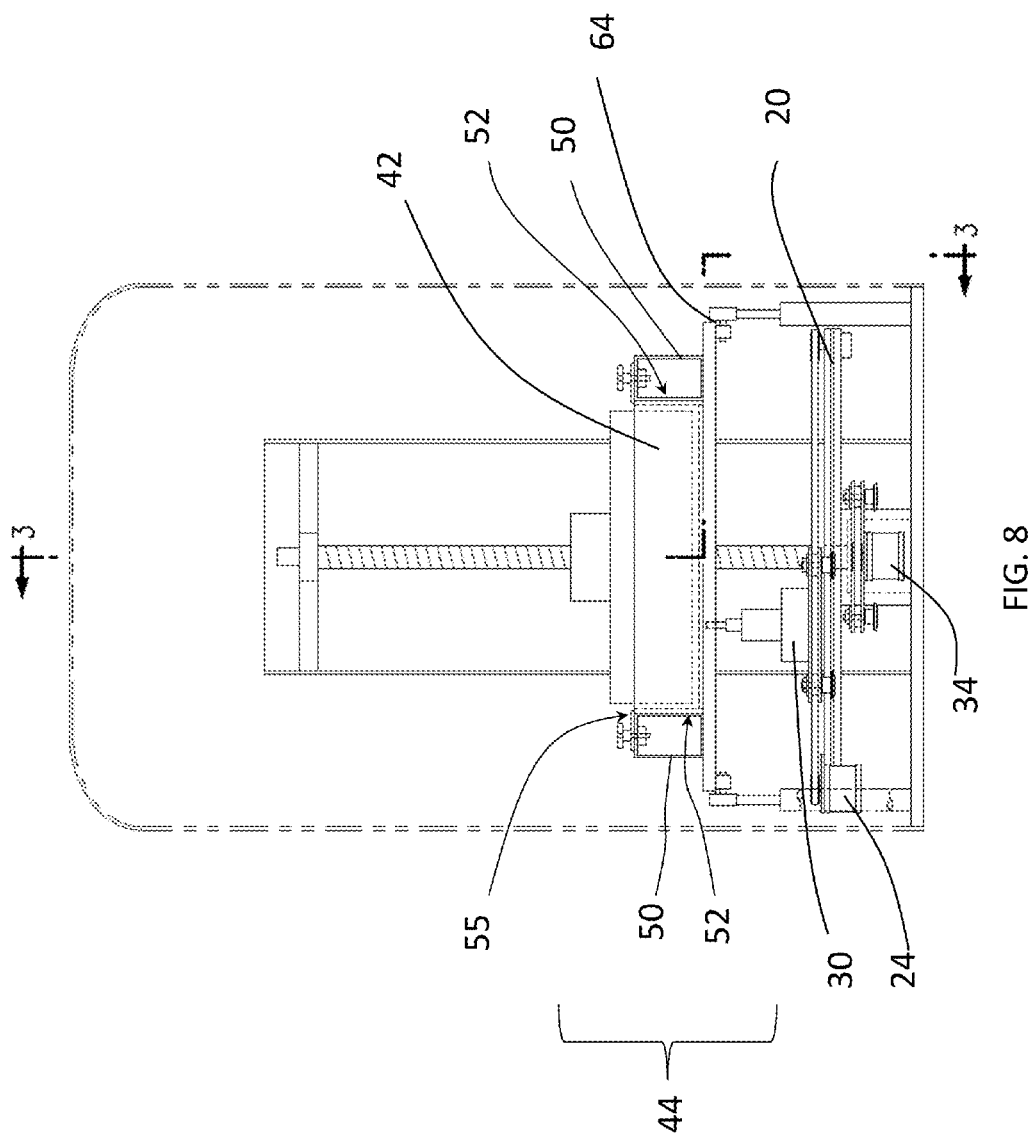

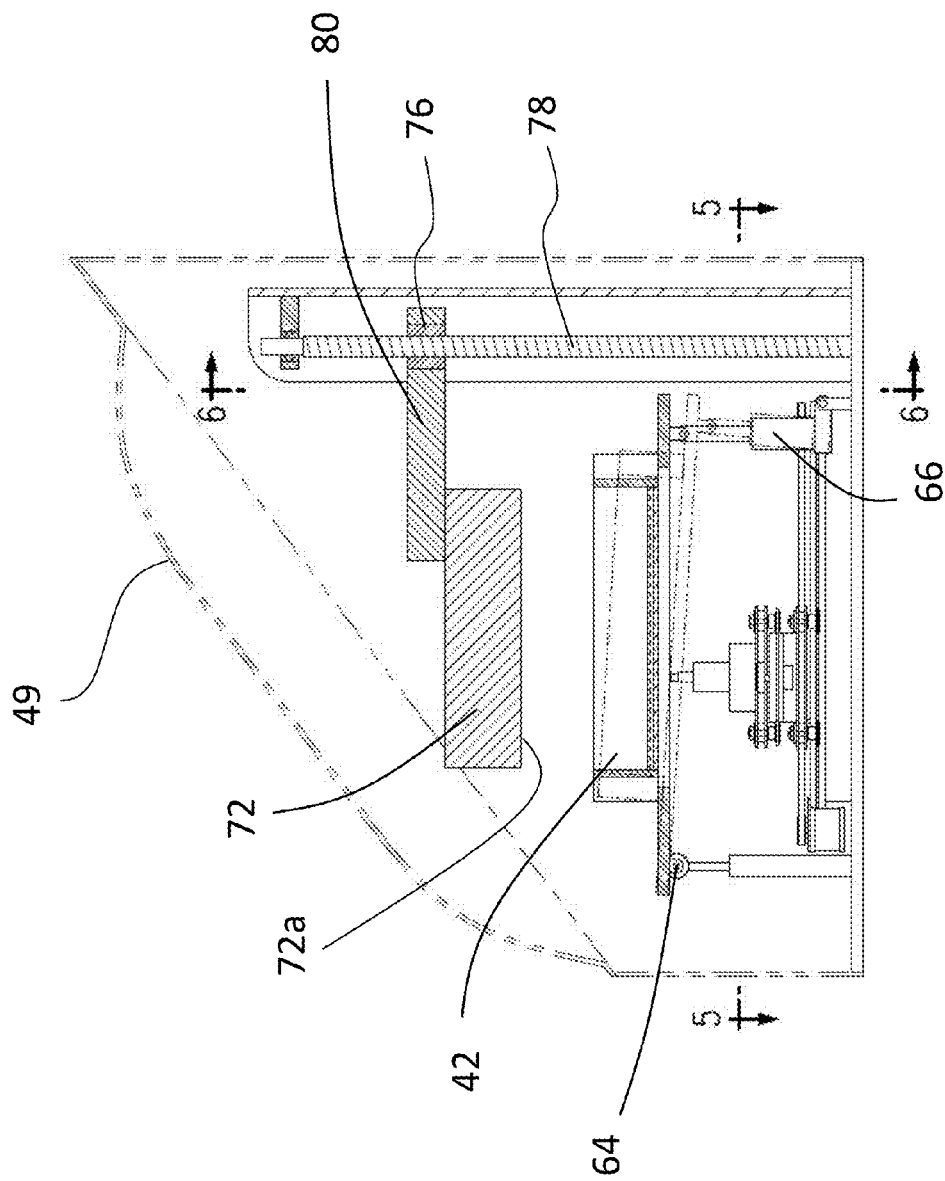

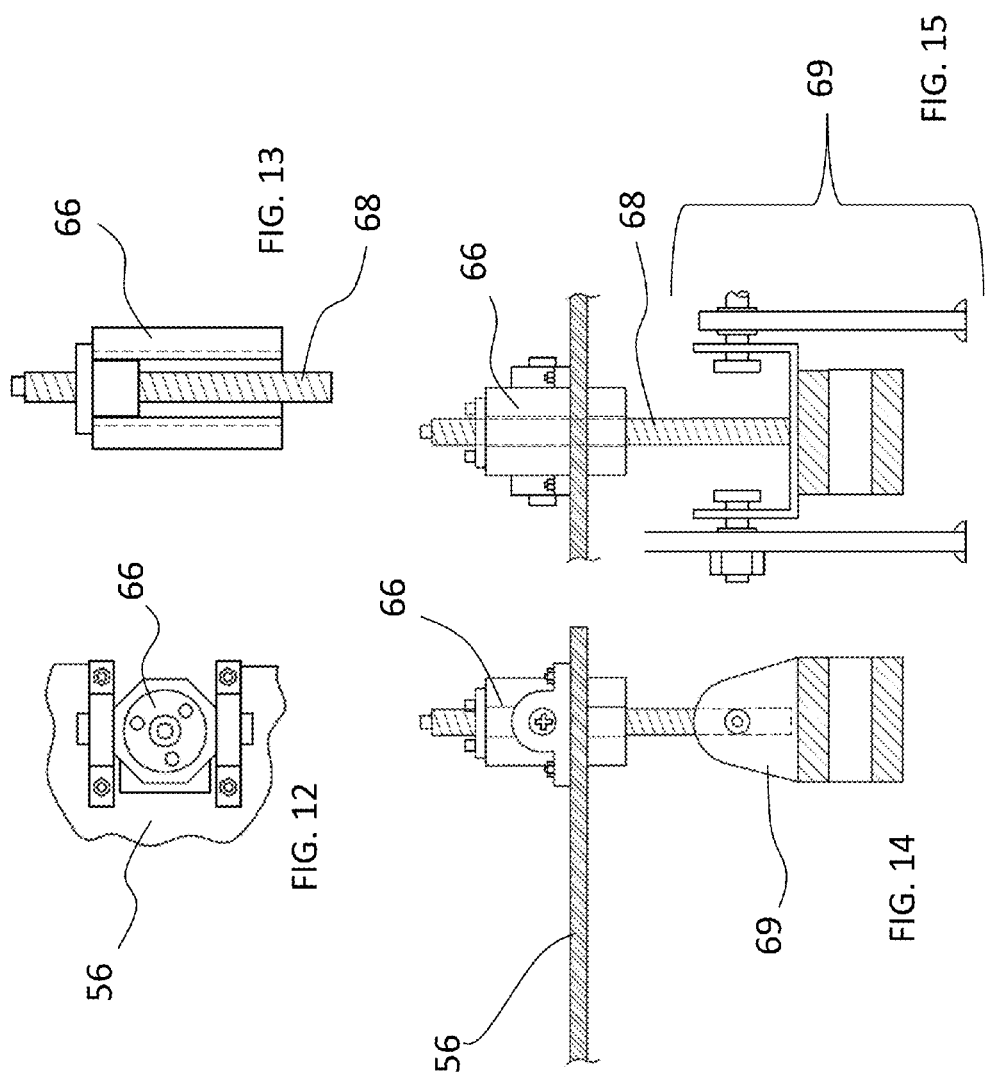

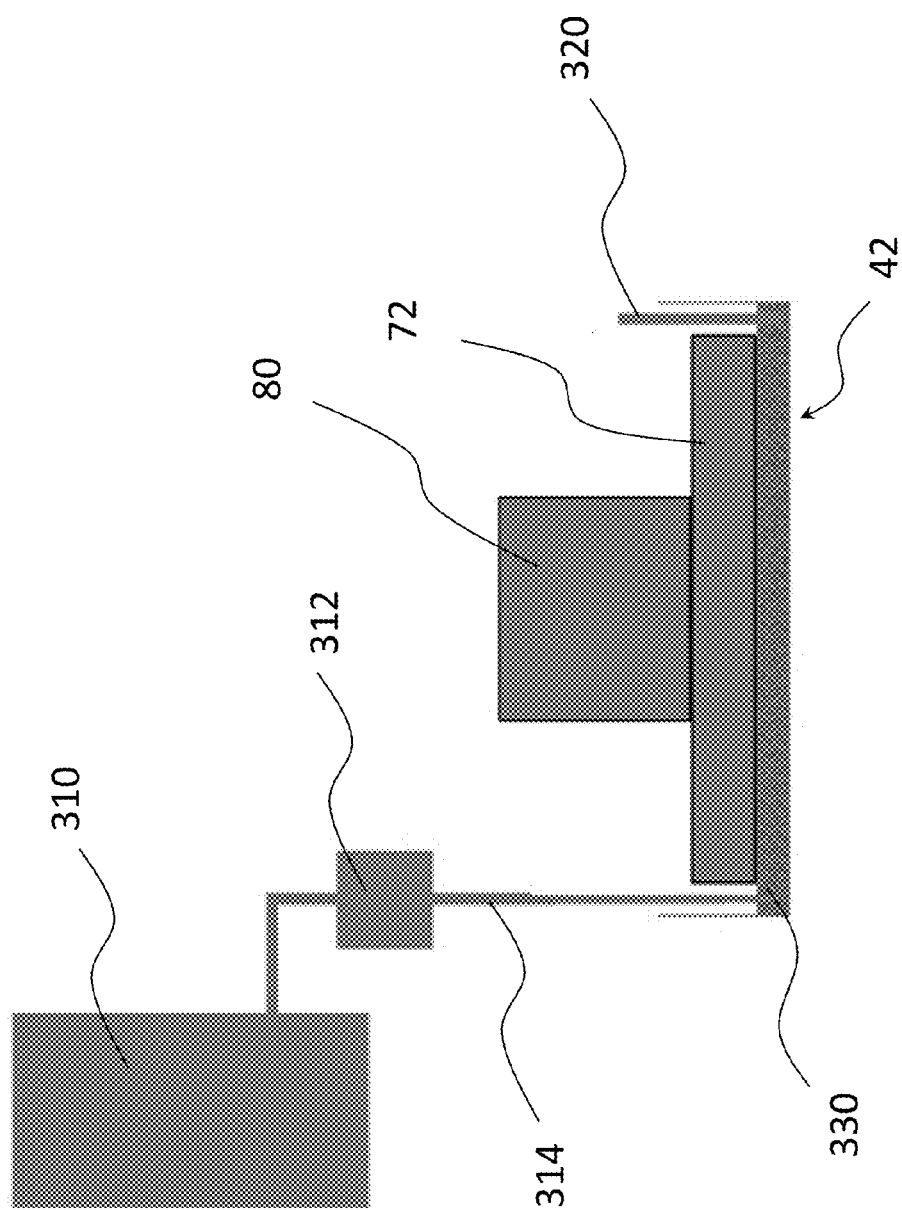

APPARATUS FOR PRODUCTION OF THREE-DIMENSIONAL OBJECTS BY STEREOLITHOGRAPHY

PRIORITY CLAIM

This application claims priority to U.S. Provisional Application No. 61/923,024, filed Jan. 2, 2014, the contents of which are herein incorporated by reference.

BACKGROUND

It is common practice in the production of plastic parts and the like to first design such a part and then painstakingly produce a prototype of the part, all involving considerable time, effort and expense. The design is then reviewed and, oftentimes, the laborious process is again and again repeated until the design has been optimized. After design optimization, the next step is production. Most production plastic parts are injection molded. Since the design time and tooling costs are very high, plastic parts are usually only practical in high volume production. While other processes are available for the production of plastic parts, including direct machine work, vacuum-forming and direct forming, such methods are typically only cost effective for short run production, and the parts produced are usually inferior in quality to molded parts.

In recent years, "stereolithography" systems have come into use. Stereolithography is a method for building plastic parts by successively printing cross-sections of photopolymer or the like (such as liquid plastic) on to each other until all of the thin layers are joined together to form a whole part. With this technology, the parts can be generated in a vat of liquid plastic. However, concerns over the speed, reliability, precision, size limitations, high energy and high costs face the use of stereolithography systems.

SUMMARY

According to at least one exemplary embodiment, a system for making three dimensional physical objects is disclosed. The system may have a frame, a build platform movably coupled to the frame along a z-axis, a vat removably secured so that the build platform may be lowered within the vat, and a movable radiation source capable of movement along an x and y-axis. The vat may have a radiation permeable flat bottom. The build platform may have a work surface disposed thereon. There may be at least one stepper motor capable of moving the radiation source, the build platform, or both the radiation source and the build platform. There may also be a power source, a data reader device and or computer communication device, and a microcontroller in communication with the at least one stepper motor and at least one of the data reader device or computer communication device.

According to another exemplary embodiment, a method for making three dimensional physical objects is disclosed. The method may include providing a system for making three-dimensional physical objects. The system may have a frame, a build platform movably coupled to the frame along a z-axis, a vat removably secured so that the build platform may be lowered within the vat, and a movable radiation source capable of movement along an x and y-axis. The vat may have a radiation permeable flat bottom. The build platform may have a work surface disposed thereon. There may be at least one stepper motor capable of moving the radiation source, the build platform, or both the radiation source and the build platform. There may also be a power source, a data reader device and or computer communication device, and a microcontroller in communication with the at least one stepper motor and at least one of the data reader device or computer communication device. Next, the method may include filling the vat with a photo-curable polymer. A three dimensional drawing file may be provided to the data reader or computer. Finally, the system may be allowed to communicate the file data to the microcontroller and subsequently control the stepper motors and radiation source to cure the photo-curable polymer and form an object in accordance with the data file.

BRIEF DESCRIPTION OF THE FIGURES

FIG. 4 shows an exemplary embodiment of a radiation source positioning assembly for an apparatus for the production of three dimensional objects by stereolithography;

FIG. 5 shows an exemplary embodiment of a radiation source positioning assembly for an apparatus for the production of three dimensional objects by stereolithography;

FIG. 6 shows an exemplary embodiment of a radiation source positioning assembly for an apparatus for the production of three dimensional objects by stereolithography;

FIG. 7 shows an exemplary embodiment of a radiation source positioning assembly for an apparatus for the production of three dimensional objects by stereolithography;

FIG. 8 shows an exemplary embodiment of an apparatus for the production of three dimensional objects by stereo lithography;

FIG. 9 shows an exemplary embodiment of an apparatus for the production of three dimensional objects by stereolithography;

FIG. 12 shows an exemplary embodiment of vat stepper motor assembly;

FIG. 13 shows an exemplary embodiment of vat stepper motor assembly;

FIG. 14 shows an exemplary embodiment of vat stepper motor assembly;

FIG. 15 shows an exemplary embodiment of vat stepper motor assembly;

FIG. 24 shows an exemplary embodiment of a polymer cartridge assembly.

DETAILED DESCRIPTION

Figure 1:
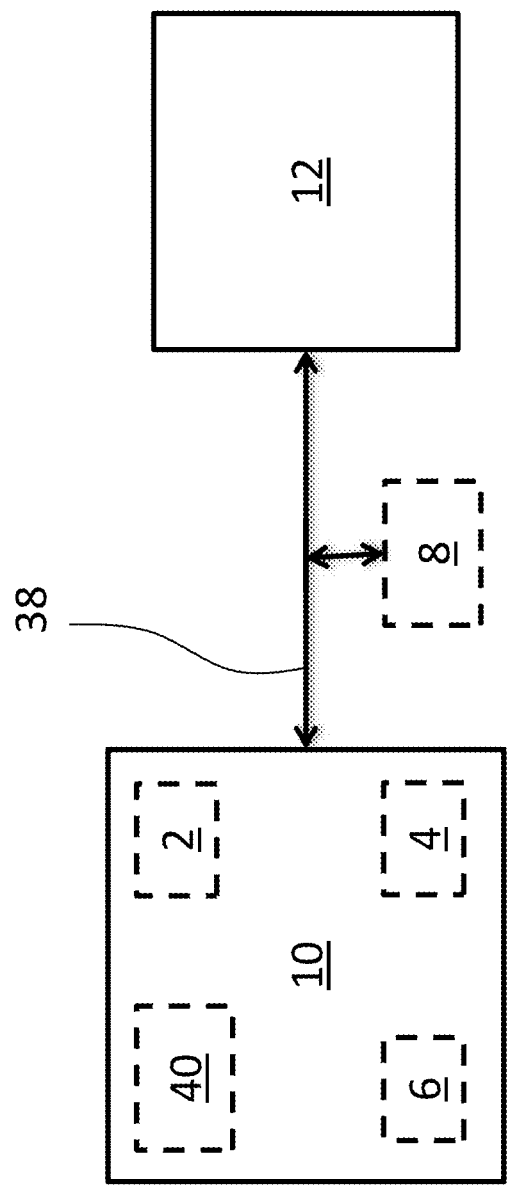
FIG. 1 shows a diagram of exemplary components of an apparatus for the production of three dimensional objects by stereolithography.
Figure 2:
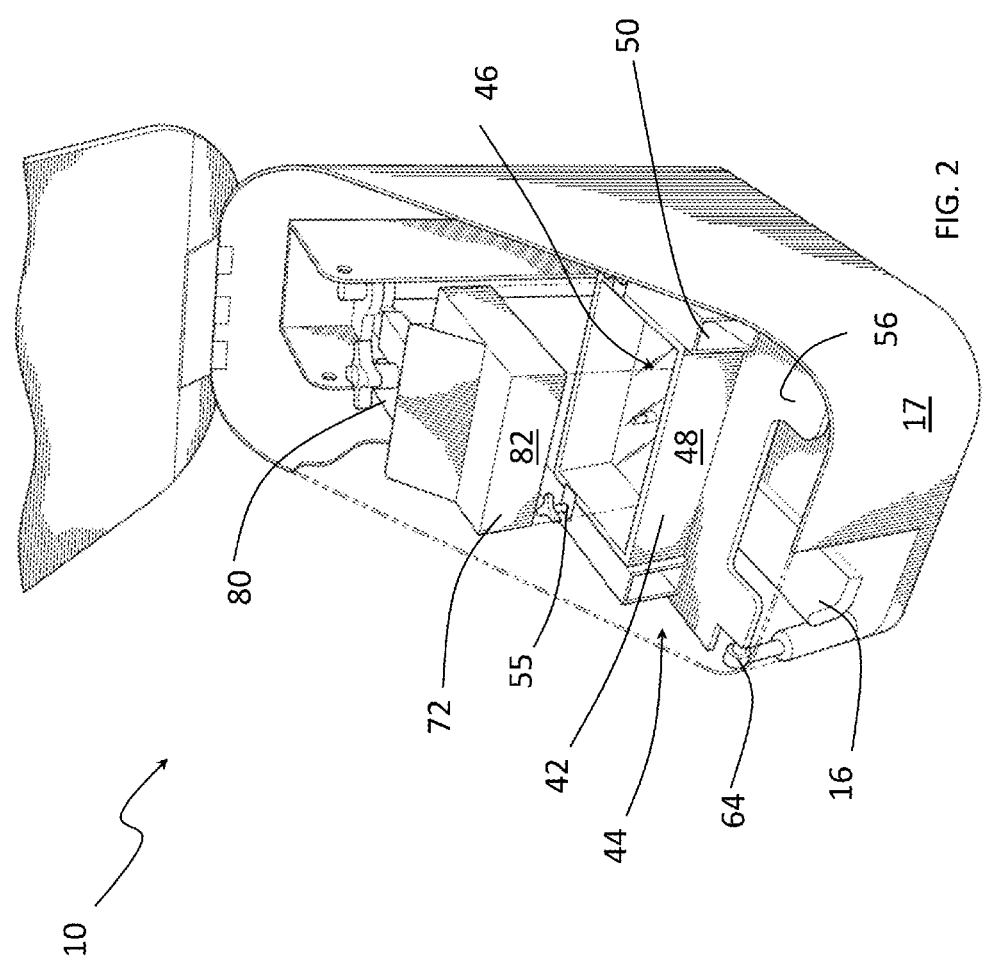
FIG. 2 shows an exemplary embodiment of an apparatus for the production of three dimensional objects by stereolithography.
Figure 3:
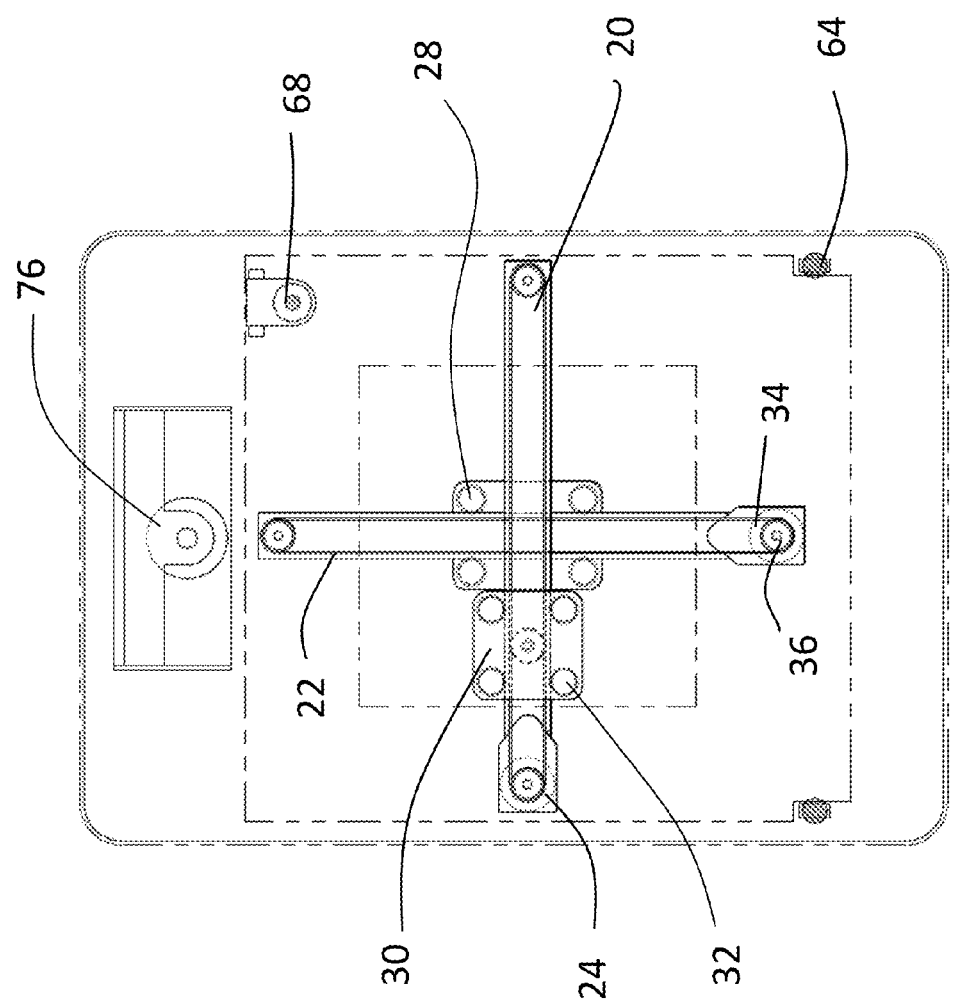
FIG. 3 shows an exemplary embodiment of a radiation source positioning assembly for an apparatus for the production of three dimensional objects by stereolithography.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature(s), advantage(s) or mode(s) of operation(s).

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Referring to the figures generally, an exemplary stereolithography system may include an SLA manufacturing assembly 10 that is in communication with a computer 12. Computer 12 may be incorporated manufacturing assembly 10 or may be remote to manufacturing assembly 10. The components of manufacturing assembly 10 may be actuated by computer 12. Components may include at least one stepper motor 4 and at least one laser assembly 6. Manufacturing assembly 10 may further include at least one microcontroller 40. The at least one microcontroller 40 may be utilized to meet the demands of both stepper drivers and encoders implemented in manufacturing assembly 10. In some embodiments, the at least one microcontroller 40 may be an advanced microcontroller. As an example, but not to be read as limiting, an exemplary microcontroller may be a MARVELL Arm M4, M5, M6, M7, M8 and the like. Manufacturing assembly 10 may also include a power source 2, which may be a plug or independent power source. A GPU hardware accelerator 8 may further be communicatively coupled to the computer 12 and/or microcontroller 40 to facilitate improved printer capability. The GPU 8 may be used to aid in the preparation of a three dimensional file. A slicing engine may be used to translate a three dimensional file into an X,Y,Z coordinate system for the laser on an X,Y gantry with a corresponding Z to use to process a polymer. In some embodiments, a computer processor may be used to slice files in normal slicing operations. In other exemplary embodiments, a multitude of processing cores in a GPU may be used to slice a file. A GPU may facilitate a multifaceted approach file, while a common processor may work on a singular path. For exemplary purposes, but not to be read as limiting, an exemplary GPU may be an NVIDIA GTX 660 and the like. Computer 12 may communicate instructions in a wired or wireless manner, such as through WiFi, Bluetooth, laser, radio frequency, infrared, microwave, or other wireless communication capabilities, as would be understood by a person having ordinary skill in the art. A digital computer file that is representative of a work piece that is to be manufactured may be stored in a computer aided manufacturing (CAM) or computer aided design (CAD) file that can be accessed by computer 12. Such files, by way of example, may typically be AutoCAD or other 3D design or scanner program files, and are typically .STL or .OBJ files.

The computer file may be capable of identifying sequential "slices" of a digital model of a manufacturing object and transmitting X, Y and Z-coordinates of corresponding layers of the work piece that is to be manufactured by the SLA device. The X and Y coordinates may or may not vary with each layer of the work piece (W). In some exemplary embodiments, the Z coordinate may change by a constant amount (corresponding to the thickness of each layer) from one layer to the next.

In an exemplary embodiment, SLA manufacturing assembly 10 may have a rigid frame 16. Frame 16 may be surrounded by exterior walls. In an exemplary embodiment, frame 16 and exterior walls may form a base sized to hold necessary hardware and a laser rail system. There may be a hingedly attached lid portion, which may fit above the base and enclose the remaining components of manufacturing assembly 10. In other exemplary embodiments, frame 16 and the exterior walls may form a substantially cuboidal shape. Frame 16 and the exterior walls may also substantially form the shape of a right trapezoidal prism. In alternative exemplary embodiments, frame 16 and the exterior walls may form a variety of shapes and sizes that would be understood to work with the foregoing description by a person having ordinary skill in the art. Frame 16 may include a bolt-free, weld-only structure comprised of both a Z-axis linear bearing mounting channel and a Y-axis linear bearing mounting plane. The exterior walls, or outer body access panels, may be rigidly fixed temporarily to act as a final structural bridge between the Y-axis linear bearing plane and the Z-axis linear bearing mounting channel. At least one of the exterior walls 17 may be removable or hingedly connected, and the exterior walls may include at least one outer window or light-shield. In an exemplary embodiment, the outer window or light shield may be disposed on a hingedly attached lid portion. In some embodiments, the outer window may have a substantially curved cross section. The outer window or light shield may prevent both UV and low visible light, between 200 to 550 nm, from contacting uncured photopolymer within the walls 17. In an exemplary embodiment, the internal portions of the frame and exterior walls may be painted or coated with a non-reflective finish so that leaked laser radiation and 200-550 nm light that may have escaped the light-shield can be dampened or absorbed. In some embodiments, the at least one removable/hingedly connected exterior wall, or access door, may form an air tight point of renewable contact at all seams when closed. This may allow, with the aid of one or more internal fans, a negative air pressure (less than current atmospheric pressure) if the access door is in a closed position. Other exemplary embodiments may not have an air tight seal or the ability to provide negative air pressure.

Now referring to exemplary FIG. 3-8, an upwardly directed laser 18 may be supported by a rail system. In some exemplary embodiments, the rail system may include an "X rail" 20 and at least one "Y rail" 22. In an exemplary embodiment, the rail system may include two "Y rails" 22. The X rail 20 may be moveably attached, for example by bearing assembly 28, to the at least one Y rail 22. The at least one Y rail 22 may be attached to the frame 16 in a fixed location. The X rail 20 may be moveable only in the +/−Y direction along the at least one Y rail 22. The at least one Y rail 22 may be stationary with respect to the frame 16.

In some exemplary embodiments, the rail system may be capable of reading its position. This capability may be similar to a linear scale in direct communication with a rotary encoder. An exemplary embodiment may utilize an advanced microcontroller and a GPU to handle slicing the code. The rail system may include a closed loop rotary encoder and linear scale to provide the capability of measuring position, velocity, and time. In an exemplary embodiment, a position, velocity, and time motion control may be used to control the X,Y motion with respect to position, velocity, and time. This may be advantageous over open loop control with single line command positions. The position, velocity, and time control may command the X,Y motion assembly to be at a certain position and a certain velocity at a certain time. This may yield fluid and continuous motion of the laser assembly.

A first stepper motor (herein referred to as the "X stepper motor") 24 may be attached to X rail 20. More specifically, X stepper motor 24 may be attached to bearing 28 in a movable location on X rail 20. In an exemplary embodiment, the X stepper motor may have an internal rotating nut which may serve as a linear actuator when the motor is energized in either clockwise or counter clockwise rotation to move X stepper and laser 18 linearly throughout lead screw connector (herein referred to as the X connector 26), which is fixed at both ends to Y carriage 33. The carriage 30 may be moveably attached, for example by bearing assembly 32, to the X rail 20. Carriage 30 is axially moveable along the X rail 20. The X connector 26 may be fixed to allow movement (in the X direction) in accordance with instructions received by the X stepper motor 24 from the computer 12. When the X stepper internal rotating nut rotates, it may cause carriage 30 and the laser 18 to move a corresponding distance along the X rail 20. It will be understood that by this process the laser 18 can be made to move along the X rail 20 into an X coordinate in accordance with instructions received by the X stepper motor 24 from the computer 12.

A second stepper motor (herein referred to as the "Y stepper motor" 34) may be anchored to the Y carriage 33. The Y stepper motor 34 may have an internal rotating nut which serves as a linear actuator when the motor is energized in either clockwise or counter-clockwise rotation. This may move Y stepper carriage along a Y-axis, moving both the X stepper and laser 18 linearly through lead screw connector (herein referred to as the Y connector 36), which may be fixed at both lead screw ends 15a and 15b to Y axis mounting plane 16. The Y stepper motor 34 may be adapted to move a certain distance (in the Y direction) in accordance with instructions received by the Y stepper motor 34 from the computer 12. When the Y carriage 33 moves, it may cause the X rail 20, as well as the laser 18 attached to the X rail 20, to move a corresponding distance in the Y direction. It may be understood that by this process the laser 18 can be made to move (along with the X rail 20) into a Y coordinate in accordance with instructions received by the Y stepper motor 34 from the computer 12.

In an exemplary embodiment, the stepper motors (X, Y, Z, or vat stepper motor) may be screw driven. But in other embodiments these stepper motors may be belt driven, electrically driven, pneumatically driven, hydraulically driven, magnetically driven, or other configurations as would be understood by a person having ordinary skill in the art. The stepper motors may be mechanically linked to corresponding connectors via screw, belt, clutch or other configurations as would be understood by a person having ordinary skill in the art. The stepper motors may also have linear actuators, or may, alternatively, have rotational shafts, in which case the rotational output may be converted to linear movement by cams, belts or other configurations as would be reasonably understood by a person having ordinary skill in the art. In screw driven embodiments, the stepper motors may have an internal rotating nut that drives the carriage along a threaded shaft.

In an exemplary embodiment, the laser positioning instructions from the computer 12 may be transmitted, for example by cable 38, to a microcontroller 40 or onboard computer, which in turn may transmit X-Y coordinate instructions to the respective X stepper motor 24 and the Y stepper motor 34. Alternatively, the instructions may be wirelessly transmitted from the computer to the microcontroller 40 via radio waves, infrared waves, or other signal waves as discussed above.

In an alternative embodiment, there may be only one rail, which may movably connected to frame 16, for example by bearing assembly 29. For an exemplary embodiment in accordance with the surrounding description, the rail may extend longitudinally along an X-axis. The rail may be movable along a Y-axis. A stepper motor may cause the rail to move along the Y-axis. A stepper motor may also be disposed and connected so as to move a laser carriage along the longitudinal axis of the rail (X-axis in this exemplary embodiment). Working in concert, the one rail may move along the Y-axis and the laser carriage may move along the X-axis. This may allow the laser carriage to be positioned at or moved to desirable X, Y coordinates. It is important to understand that the one rail may extend along either the X-axis or alternatively the Y-axis, as would be understood by a person having ordinary skill in the art. If the rail were to extend along a Y-axis, the rail would move along an X-axis and the laser carriage would move along the Y-axis by traveling along the rail.

Figure 10:
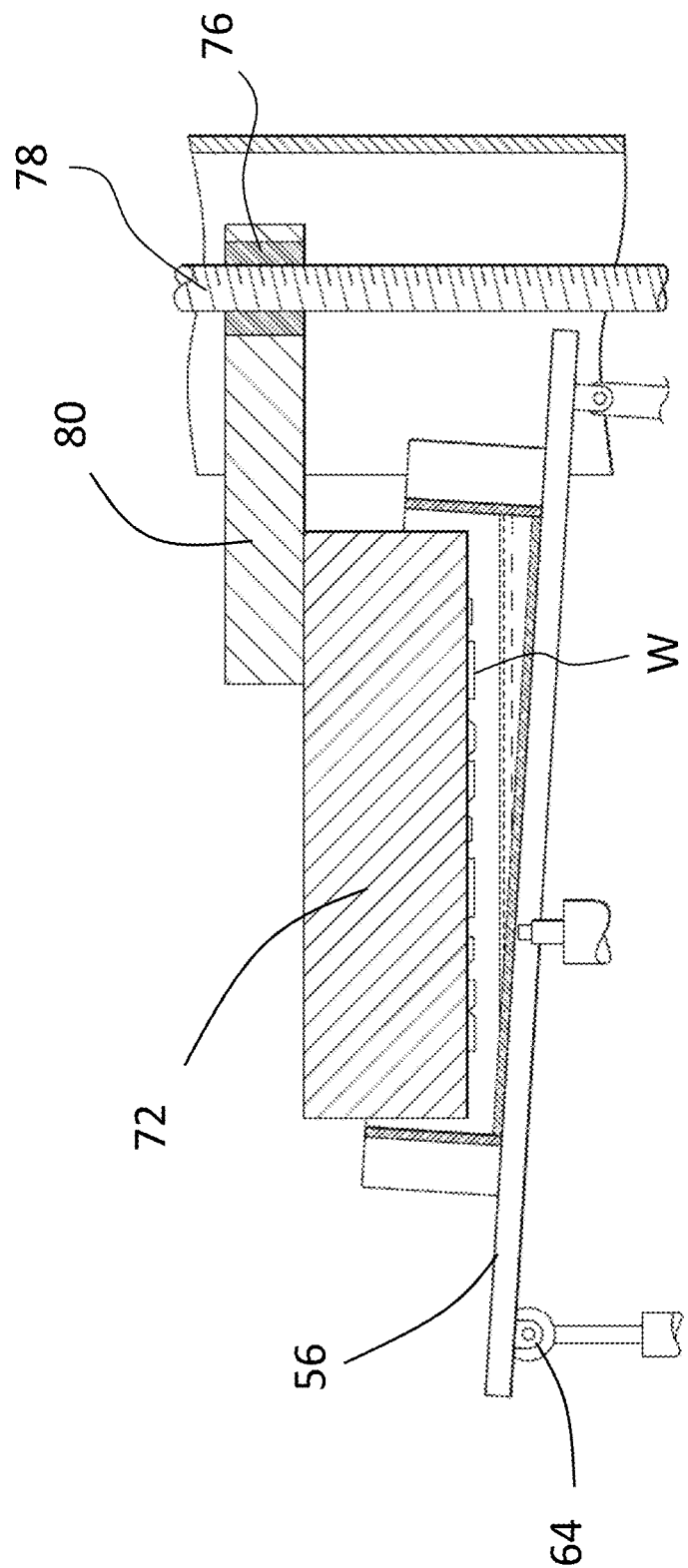
FIG. 10 shows an exemplary embodiment of a vat assembly and build platform of an apparatus for the production of three dimensional objects by stereolithography.
Figure 11:
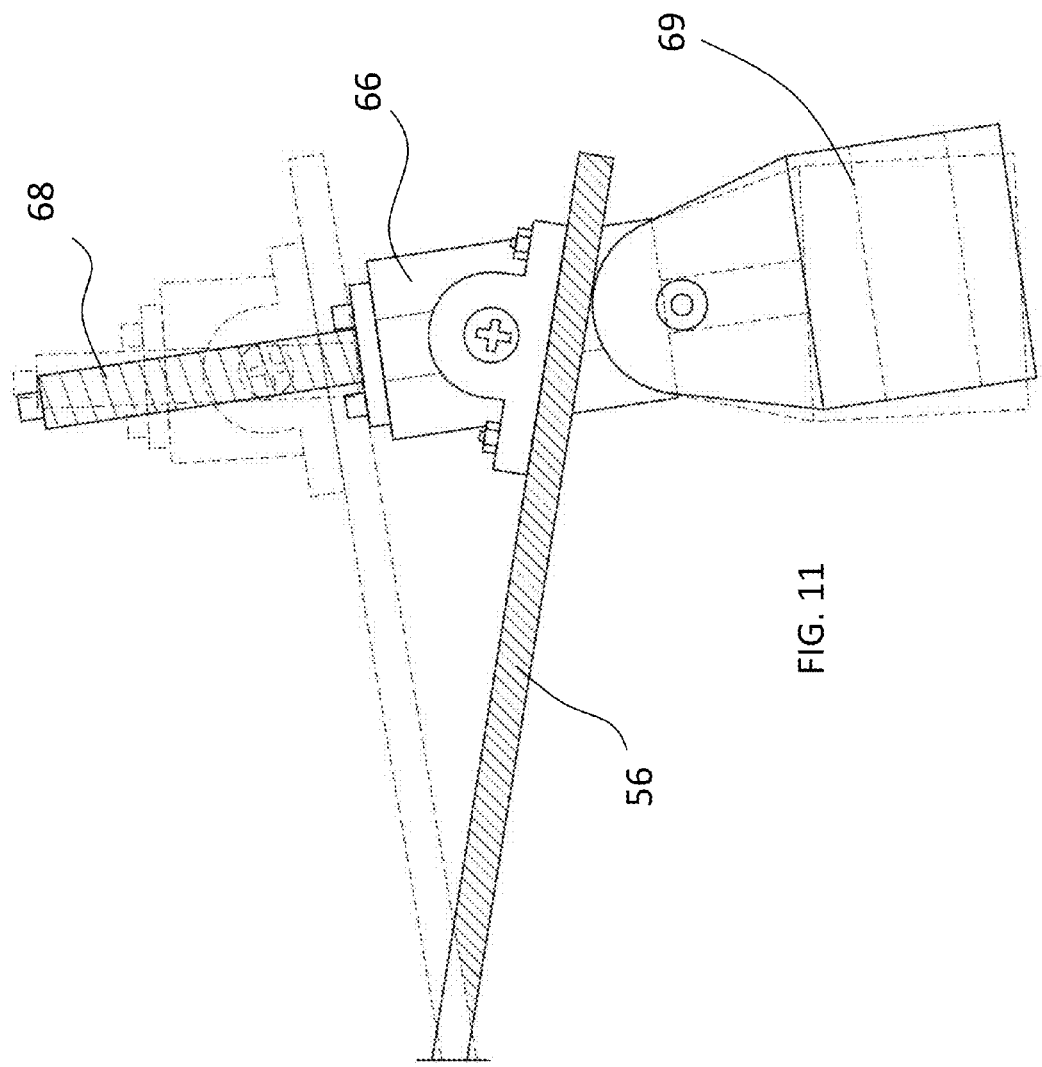
FIG. 11 shows an exemplary embodiment of vat stepper motor assembly.

Referring to exemplary FIGS. 8-10, an open top fluid reservoir, referred to herein as a "vat" 42, may be removably supported within frame 16, inside of a vat mounting assembly 44. In an exemplary embodiment, vat 42 may have a horizontal bottom window 46 and closed side walls 48, which together form an open-top, liquid-impermeable reservoir cavity adapted to contain uncured photocurable liquid polymer or resin. In an exemplary embodiment, the bottom window 46 may be a plate glass window of mirror quality. In some exemplary embodiments, window 46 may be composed of optically collimating quartz.

Mounting assembly 44 may include a pair of horizontally spaced-apart brackets 50 that are adapted to receive and support the vat 42 inside of the frame 16 of the SLA assembly 10. In an exemplary embodiment, each bracket 50 may have a substantially vertical side portion 52 and a removably attached horizontal tab portion 55 disposed on the top edge thereof. Substantially vertical side portion 52 may be approximately the same height or shorter than the side walls of vat 42. Horizontal tab portion 55 may extend over the top edge of an adjacent side wall of vat 42 when vat 42 is inserted in mounting assembly 44. Horizontal tab portion 55 may be tightened to the top edge of the substantially vertical side portion 52, until it securely holds vat 42 in place.

When the device is not in operation, the vat 42 can be horizontally withdrawn (e.g., manually) from the mounting brackets 50 and completely removed from the SLA assembly 10. In some embodiments, vat 42 may be vertically withdrawn. In yet further embodiments, the vat 42 may be horizontally or vertically withdrawn. This may allow for cleaning and maintenance of the vat 42. It may also allow for adjustment of the volume of photocurable liquid in the vat 42.

The mounting assembly 44 may additionally have a mounting deck 56 which may extend horizontally between opposing brackets 50. A mounting deck 56 may be rigidly attached to opposing brackets 50. The opposing brackets 50 and the mounting deck 56, together, may partially enclose a mounting cavity into which the vat 42 may be inserted. There may be an opening disposed in mounting deck 56, through which a laser beam may pass when the SLA assembly 10 is in operation. The opening may correspond to the size, shape, and location of vat bottom window 46 when a vat 42 is mounted in mounting assembly 44.

In an alternative exemplary embodiment, each bracket 50 may have a substantially vertical side portion 52 and a substantially horizontal shoulder or flange at or near the top of the side portion of the bracket. The shoulder or flange may take the place of tab 55 and may extend a distance along side portion 52. In such embodiments, vat 42 may have to be inserted and removed horizontally. An elongated bushing member may be affixed to the underside of a bracket shoulder on each of the brackets 50. In an exemplary embodiment, the bushing member may be a non-rigid solid material, such as nylon. The "front" end of a bushing member may be curved or tapered, so as to facilitate insertion of the vat 42 into the mounting cavity. There may be tightening screws for tightening the fit of the vat 42 in the brackets 50. The tightening screws may tighten the bushing material to the top of vat 42. The adjustment of these tightening screws may calibrate the damping. The vat mounting assembly may be constructed without bushing members, but rather the mounting assembly may be provided with springs, gaskets, compression screws or other common devices for securing the removable vat in a fixed position with respect to the vat mounting bracket. In embodiments utilizing tabs 55, bushing members may be disposed on an underside of tabs 55.

In some exemplary embodiments, the nominal distance between the top face of the mounting plate 56 and the bottom face of the bushing, tab, or shoulder may be approximately the same as, or slightly less than, the height of the side walls 48 of the vat 42, so as to effect a snug, albeit removable fit of the vat side walls 48 within the mounting brackets 50. In operation, the vat 42 may manually be horizontally inserted into, or withdrawn from, the mounting assembly.

Now referring to exemplary FIGS. 9-15, one end of vat mounting assembly 44 may be pivotably attached, for example by hinge 64, to the frame 16. The opposite end of the mounting assembly 44 may be connected (via connector 68) to a vat stepper motor 66, which in turn may be attached to the frame 16. Alternatively, vat stepper motor 66 may be affixed to mounting assembly 44 and may be configured to travel along connector 68. Connector 68 may be affixed to frame 16. In an exemplary embodiment, connector 68 may be affixed to frame 16 by hinge assembly 69. The axis of rotation of hinge 64 may be horizontally oriented, so as to permit the opposite end of the mounting assembly to be rotated up and down by the vat stepper motor 66 while the hinged end of the mounting assembly remains in a substantially fixed location with respect to frame 16.

In an exemplary embodiment hinge 64 may be connected to the front end of the mounting bracket assembly 44, and the back end of the mounting bracket may be moveable upwardly and downwardly (albeit in an arc). In alternative embodiments, hinge 64 may be attached to the "back" or to a "side" of the mounting assembly 44.

In an exemplary embodiment, the vat mounting assembly 44 may be supported from the frame 16 at a first end by hinge 64 and at second end by vat stepper motor 66. In an alternative embodiment, a second end of the mounting assembly 44 may be supported by an alternate mechanism (for example, by a cam connected to frame 16), in which a modification of the vat stepper motor 66 could be used for repositioning the vat without requiring that the vat stepper motor 66, itself, provide support for the vat mounting assembly.

Figure 16:
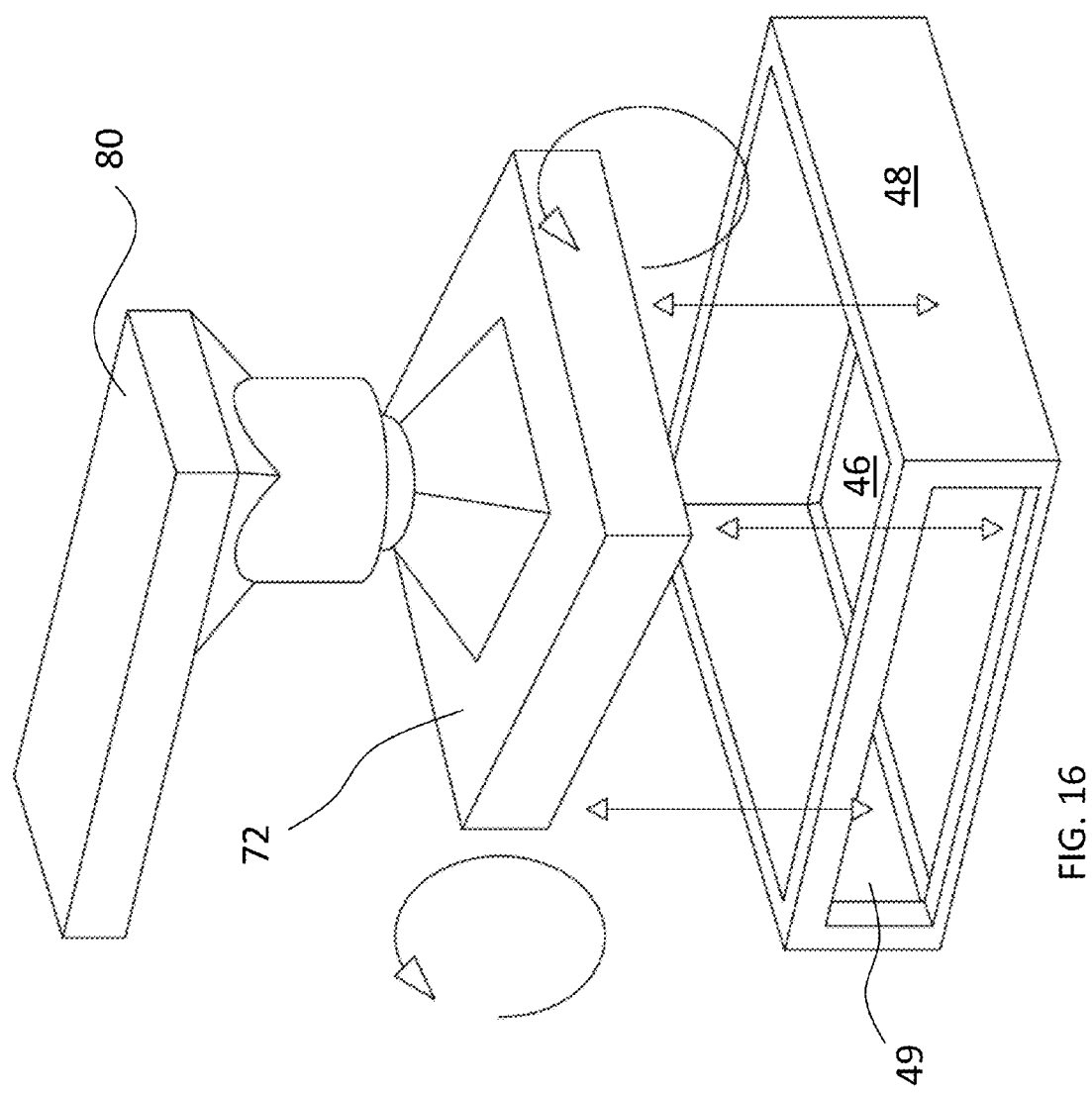
FIG. 16 shows an exemplary embodiment of vat assembly and build platform of an apparatus for the production of three dimensional objects by stereolithography.
Figure 17:
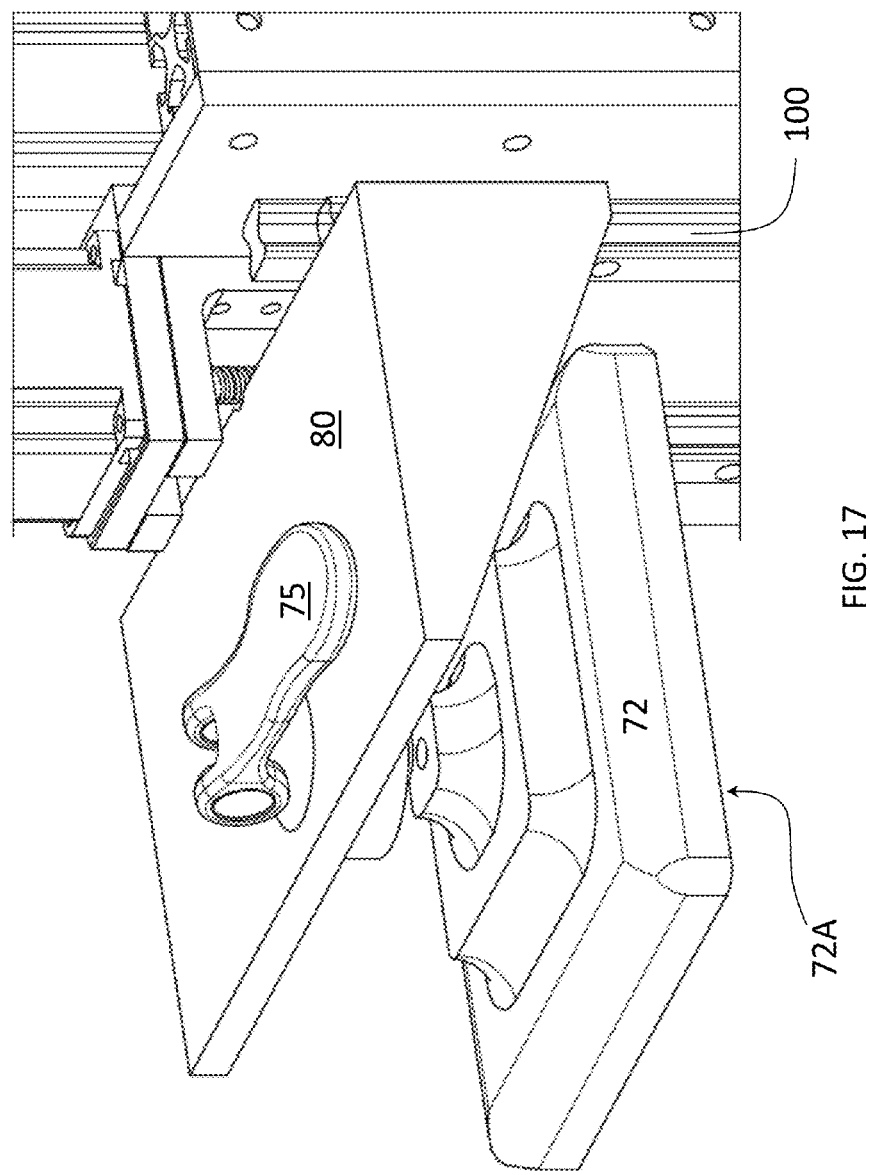
FIG. 17 shows an exemplary embodiment of vat assembly and work surface of an apparatus for the production of three dimensional objects by stereolithography.
Figure 18:
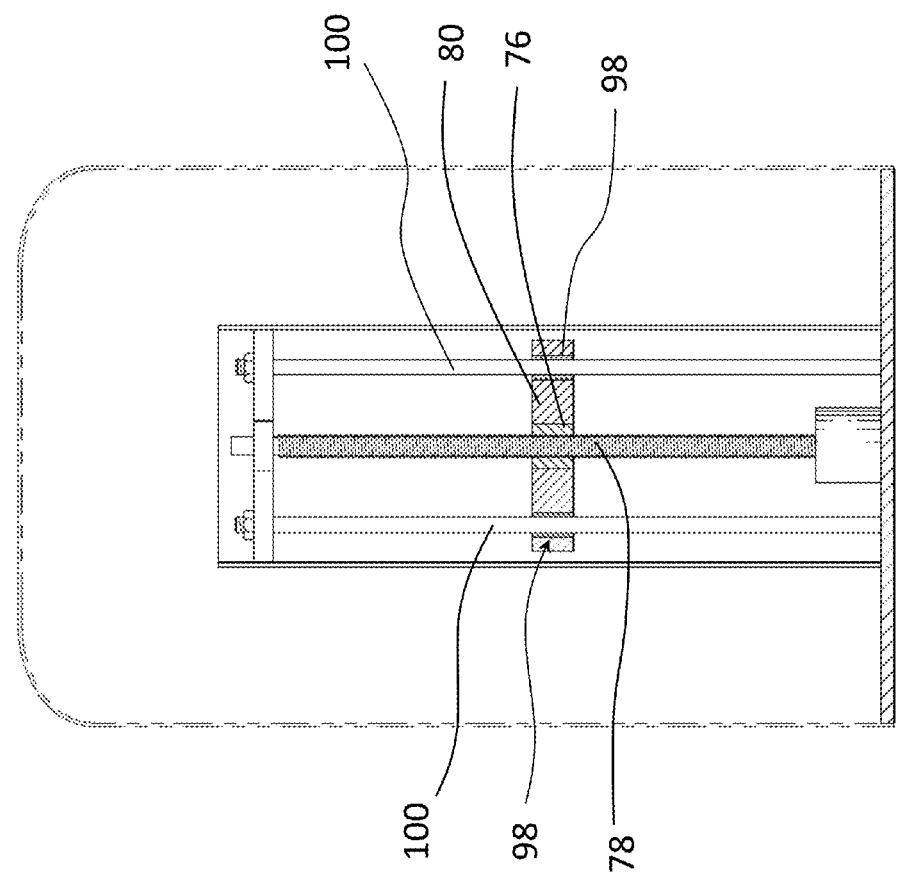
FIG. 18 shows an exemplary embodiment of a Z stepper motor assembly of an apparatus for the production of three dimensional objects by stereolithography.
Figure 19:
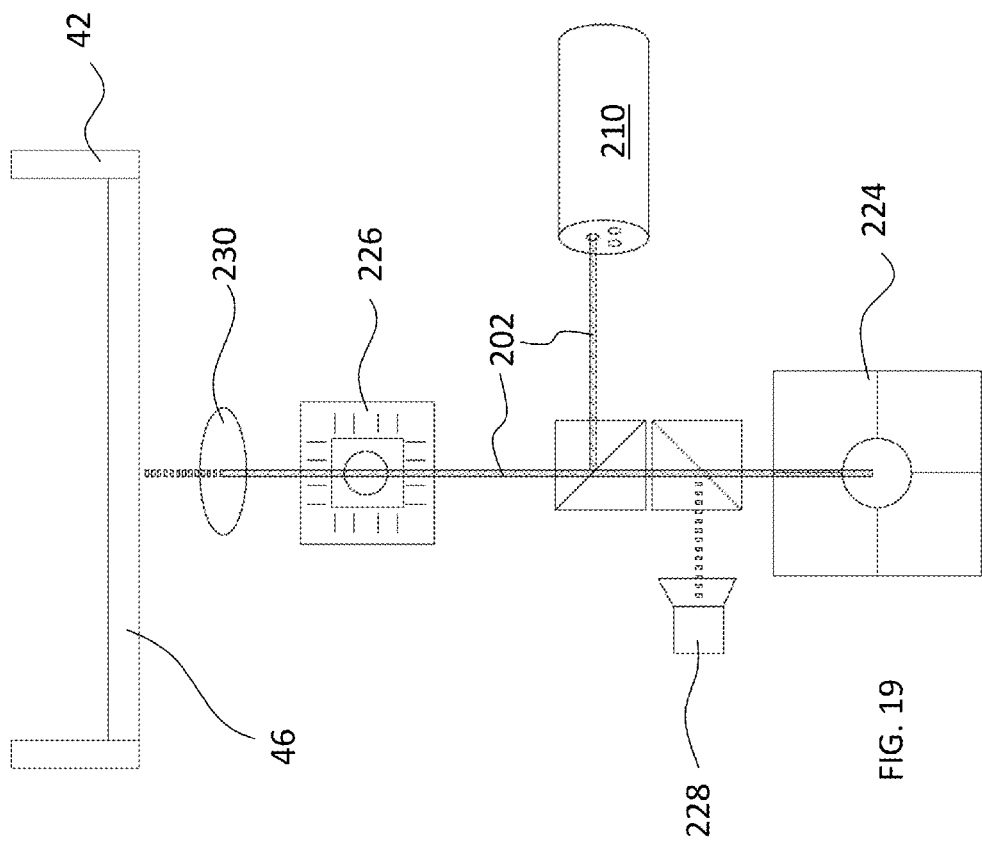
FIG. 19 shows a diagram of a radiation beam path in an exemplary embodiment of an apparatus for the production of three dimensional objects by stereolithography.

In an exemplary embodiment, side walls 48 of vat 42 may be substantially vertically oriented. Side walls 48 may be constructed of stainless steel. In other exemplary embodiments, side walls 48 of the vat 42 may be constructed of wood or wood composite. Side walls 48 may be composed of material having vibration dampening characteristics. Additionally, side walls 48 may be composed of a material unlikely to gouge the side walls and that can be constructed to fit snugly between the mounting deck 56 and the bushings or securing tabs 55, without requiring additional fastening devices to hold the vat 42 in place. Although the construction material of the sidewalls 48 of the vat may be wood, other materials as would reasonably be understood by a person having ordinary skill in the art, such as plastic can also be used in alternative embodiments. In some further exemplary embodiments, as shown in FIG. 16, at least one window 49 may be disposed in side walls 48. Window 49 may facilitate aligning a build platform.

In an exemplary embodiment, the bottom of the vat may be made of mirror-quality glass. That is, the bottom of the vat may be made of glass that is exceptionally smooth on its two opposing planar surfaces, is transparent and is substantially rigid. In plan view, the vat 42 and its glass bottom 46 may be substantially square. In an exemplary embodiment, the glass bottom 46 may not be tinted nor have embedded laminate layer(s), as such may disadvantageously block, diffuse or otherwise reduce the light-transmitting properties of the bottom 46 of the vat.

The sidewalls 48 of the vat 42 may have a continuous dado notch that is adapted to receive a beveled perimeter of the glass bottom 46. In one exemplary embodiment, the vat glass bottom may be nominally 3/16 inches thick and may taper to about 3/32 inches thick proximate a beveled perimeter. In other exemplary embodiments, the glass may be less than 1/4 inch thick. In some alternative exemplary embodiments, glass thicker than 1/4 inch may be used. The glass may be mirror glass that has been highly polished on a mirror side with cerium oxide from a factory before silver or aluminum (mirror) coating is applied. The mirror surface may then be removed to reveal an extremely low aberration point of first laser beam contact. This exposed surface may be extremely refined due to the preservation after factory polishing. The bottom 46 of the vat may be sealed to the side walls 48 with silicone adhesive, and may be additionally secured in place with an elastomeric (e.g., rubber) wedge and screw(s). In addition to sealing the vat from leaks, the silicone may serve as a shock absorber when shock waves are transmitted through the glass.

In an exemplary embodiment, vat bottom 46 may be approximately 1/8 inch to approximately 1/4 inch above the bottom edge 48b of the vat wall. When the vat assembly 42 is removed from the SLA assembly and placed, for example, on a hard surface, it may be the bottom edge 48b of the vat wall that contacts the hard surface, and therefore it may be the bottom edge 48b of the vat wall that bears the weight of the vat assembly 42. Furthermore, in the event that the vat assembly is abruptly placed or dropped onto a hard surface, any shock waves produced by such contact may be dampened by the vat wall 48 and the silicone adhesive before reaching the bottom 46 of the vat.

Also, when the vat assembly 42 is positioned, in operation, inside of the vat mounting bracket 44, the bracket may directly contact the vat wall 48, but not the bottom 42 of the vat, thus isolating the bottom from potentially damaging external forces.

A build platform 72 may be disposed above the vat bottom 46. In an exemplary embodiment, build platform 72 may be rigid. Build platform 72 may also have a downward-facing horizontal work surface 72a. The build platform 72 may be constructed of aluminum and the work surface 72a may have a dull machined finish, which may facilitate attachment of a work piece W to the build platform 72. The build platform 72 may be supported from frame 16 by bracket 80, which may be vertically moveable via bearings 98 on vertical guides 100.

In some exemplary embodiments, as shown in the exemplary figures, a build platform 72 may be suspended by a mounting bracket 80, which may subsequently be affixed to a Z stepper motor assembly. Build platform 72 may have a planar build surface 72A, which may face vat bottom 46. Build platform 72 may be adjustably connected to mounting bracket 80 by a ball socket. The ball socket may allow the orientation of build platform 72 to be adjusted, including in an angular or rotational fashion. There may additionally be a locking handle 75 for locking the position of build platform 72. Allowing the orientation of build platform 72 to be freely manipulated may facilitate making the build surface and vat bottom 46 substantially coplanar. This may improve the print quality. In some alternative embodiments, set screws or other mechanical adjusting devices, as would be understood by a person having ordinary skill in the art, may be used to adjust the orientation of the build platform.

A Z stepper motor 76 may be used to move a build platform 72 in a vertical direction. In some embodiments, Z stepper motor 76 may be disposed in or affixed to build platform supporting bracket 80. The stepper motor 76 may rotate about a vertical screw, Z connector 78, causing the build platform supporting bracket 80 to travel in a vertical direction. In some alternative embodiments, Z stepper motor 76 may be anchored to the frame 16. The Z stepper motor 76 may cause Z connector 78 to rotate. Build platform supporting bracket 80 may be threadably mounted on Z connector 78. As the Z stepper motor 76 causes Z connector 78 to rotate, it may in turn cause the build platform supporting bracket to travel along Z connector 78. In such embodiments, there may be a fixed Z connector nut 78a rigidly attached to build platform support 80. In other embodiments, Z connector 78 may be linearly moveable. The Z stepper motor 76 may cause the build platform supporting bracket 80 to move a certain distance in the Z direction, in accordance with instructions received by the Z stepper motor 76 from the computer 12. At all times, the downwardly facing build platform work surface 72a may remain in a horizontal orientation. In operation of an exemplary embodiment, the amount of each incremental displacement of the Z connector 78 may be equal to the thickness of each layer of fabrication of the work piece W.

In operation of one exemplary embodiment, the vat 42 may be substantially filled with a liquid photocuring polymer L. In an exemplary embodiment, the liquid photocuring polymer may be polyethylene diacrylate, such as polyethylene diacrylate 200. The liquid photocuring polymer may be a variety of other photocurable polymers of various viscosities as would reasonably be understood by a person having ordinary skill in the art. Uncured liquid polymer may gravity flow in to fill the void between the work surface 72a of the build platform and an interior surface of the bottom of the vat 42. In some exemplary embodiments, there may be a polymer cartridge assembly for filling vat 42. The cartridge 310 may contain a quantity of polymer that may be fed into a closed loop monitoring system to replenish the supply of polymer in the resin vat 42 as needed. The cartridge 310 may be removed and replaced as needed. A polymer level probe 320 may be used to continuously measure the amount of polymer 330 in the resin vat 42. Polymer may be replenished in response to measurements by the probe 320. A pump 312 and hose system 314 may be used to facilitate filling of the vat with polymer from the cartridge. In accordance with instructions from the computer 12, the Z stepper motor 76 may position the downward facing work surface 72a of the build platform a predetermined distance above the interior bottom of the glass bottom of the vat. The predetermined distance above the glass bottom may correspond to the thickness of each layer of the work piece W that is to be constructed. Excess liquid polymer may be pressed out beyond the margins of the build platform 72. The liquid polymer may be replaced with other suitable liquids, including monomers and bio-composite materials, so long as the liquid used is rapidly curable to a hardened state when a voxel of the liquid is subjected to radiation in accordance with other aspects of the invention.

In some exemplary embodiments, a polymer gas treatment assembly may be used to treat the polymer. An inert gas may be transferred through the liquid polymer by a percolation system to absorb and displace byproducts of polymerization. The polymer gas treatment assembly may include a bubbler chamber component in which the polymer and gas may interact. Further, in some exemplary embodiments, the vat and build platform may be isolated by an accordion style air tight seal. The sealed spaces may be purged with inert gas to prevent chemical interaction with oxygen and other possible airborne contaminants. This may be in addition to the exterior wall enclosure being air tight.

In some embodiments, the build platform 72 may have a continuous closed wall that extends upwardly around the perimeter of the build platform 72. The build platform wall(s) may prevent excess liquid polymer from flowing onto the top of the build platform apparatus. In some alternative embodiments, build platform 72 may have a thickness greater than the depth of liquid polymer filling vat 42.

In operation, once the build platform 72 is at a desired elevation (i.e., Z coordinate), the computer may instruct the X stepper motor 24 to move laser 18 to the desired X coordinate beneath the build platform 72. The computer may also instruct the Y stepper motor to move the laser along the Y axis to the desired Y coordinate beneath the build platform 72. In a coordinated fashion, the computer may send instructions to energize the laser 18, while directing the X and Y stepper motors 24, 34 to position the centerline of the laser 18 at the respective X and Y coordinates that correspond to areas of the work piece layer that are to be cured by the laser's beam. The coordinates to which the laser may be positioned may correspond to the coordinates at which the polymer is to be photocured, which, in turn may correspond to the coordinates at which the work piece is to be built.

The amount of laser light energy that may be imparted onto any particular target area of the work piece W may depend on the intensity of the light beam and the amount of time that the target area is exposed to the light beam. During operation of an exemplary embodiment, the intensity of the light beam may be held constant during any given manufacturing run. The duration of exposure of any one target area may be controlled by the speed at which the laser beam is moved across the target. In accordance with instructions from the computer 12, the X and Y stepper motors 24, 34 may move the centerline of the laser 18 across predetermined target areas that are to be photocured at a relatively lower speed than it travels to non-targeted coordinates.

The laser may be moved around in this manner, in accordance with instructions from the computer 12 until all targeted areas of the polymer layer have been selectively exposed to laser radiation. It may be appreciated that the diameter of an area of the target polymer layer that is exposed to the laser light beam may correspond to the diameter of the laser beam.

Once all the target areas of the first polymer layer have been exposed to the laser beam, one complete layer of the work piece may have been manufactured.

It may be understood that in the above described process, the laser beam may shine vertically upward, directly through the opening 60 in the mounting deck 56, and through the glass bottom 46 of the vat, and into the target voxels of the target polymer layer, and thereby selectively expose the photocurable polymer to laser radiation.

As introduced above, actuation of the vat stepper motor 66 may cause the vat 42 to pivot away (i.e., downwardly) from the work surface 72a of the build platform 72. During the process of curing the each polymer layer, the curing of the polymer causes the work piece (W) to temporarily adhere to the upwardly facing interior surface 46a of the glass bottom of the vat 42. In order to construct the next layer of the work piece (W), the just-cured layer of the work piece must be detached from the bottom 46 of the vat 42.

It may be appreciated that by pivoting the vat 42, rather than pulling it away from the build platform in a direction perpendicular to the work surface 72a of the build platform, the work piece (W) may "peel" away from the glass bottom 46 of the vat 42, thereby minimizing the buildup of stresses in either the work piece (W) or the glass bottom 46.

In an exemplary embodiment, the vat 42 may pivot downwardly a maximum arc of approximately one inch. As the vat 42 pivots downwardly, a gap may open between the build platform work surface 72a and the vat print surface 46a. This may cause uncured liquid polymer to flow into that gap.

After uncured polymer has flowed into the gap between the build platform work surface 72a and the vat print surface 46a, the vat stepper motor 66 may actuate (in response to instructions from the computer), thereby causing the vat 42 to pivot back into its original and true horizontal orientation and position. Then, the entire manufacturing process may be repeated for each subsequent layer until the work piece (W) is completed.

The Z stepper motor 76, upon instructions from the computer, may raise the build platform 72 one increment (corresponding to the thickness of a laminate layer), and the entire manufacturing process may be repeated until a work piece is completed. The Z stepper motor 76 may raise the build platform before or after the "peel" process that occurs as the vat 42 is pivoted, as described above.

For any particular polymer material, the amount of radiation or light energy that is required to cure a given volume (e.g., voxel) of that material is substantially constant. In an exemplary embodiment, the radiation beam may be produced by a laser or L.E.D. incandescent radiation generator. Alternative devices for creating light energy to activate photo curable polymer may also be used.

If a voxel is exposed to too much radiation, the voxel of polymer may over-cure. Typically, this may result in the over-cured voxel being too hard. It may also cause the over-cured voxel to adhere too strongly to the vat bottom 46, which, in turn, may result in damaging the work object W when the vat 42 is pivoted away from the build platform 72. Alternatively, if a voxel is exposed to too little radiation, the voxel of polymer may under-cure. Typically, this may result in the under-cured voxel being too soft.

It may be desirable to minimize the amount of radiation energy that must be generated by an exemplary embodiment, and, in particular, by the laser in order to produce the work object. In order to minimize the amount of radiation that must be generated, the path length between the laser source and target voxel may be minimized. In some exemplary embodiments, the path of the laser beam from the laser source to the target voxel may be a straight line, the only object between the source of the laser beam and the target voxel may be the bottom of the vat. The aperture through which the laser beam is emitted from the laser generator may be fixed and circular, the focal length of the focusing lens of the laser generator may be minimized, and the radius of curvature of the focusing lens may be minimized, all of which may allow operation with a laser beam having much lower power intensity, and correspondingly much higher electromagnetic wavelength.

Figure 20:
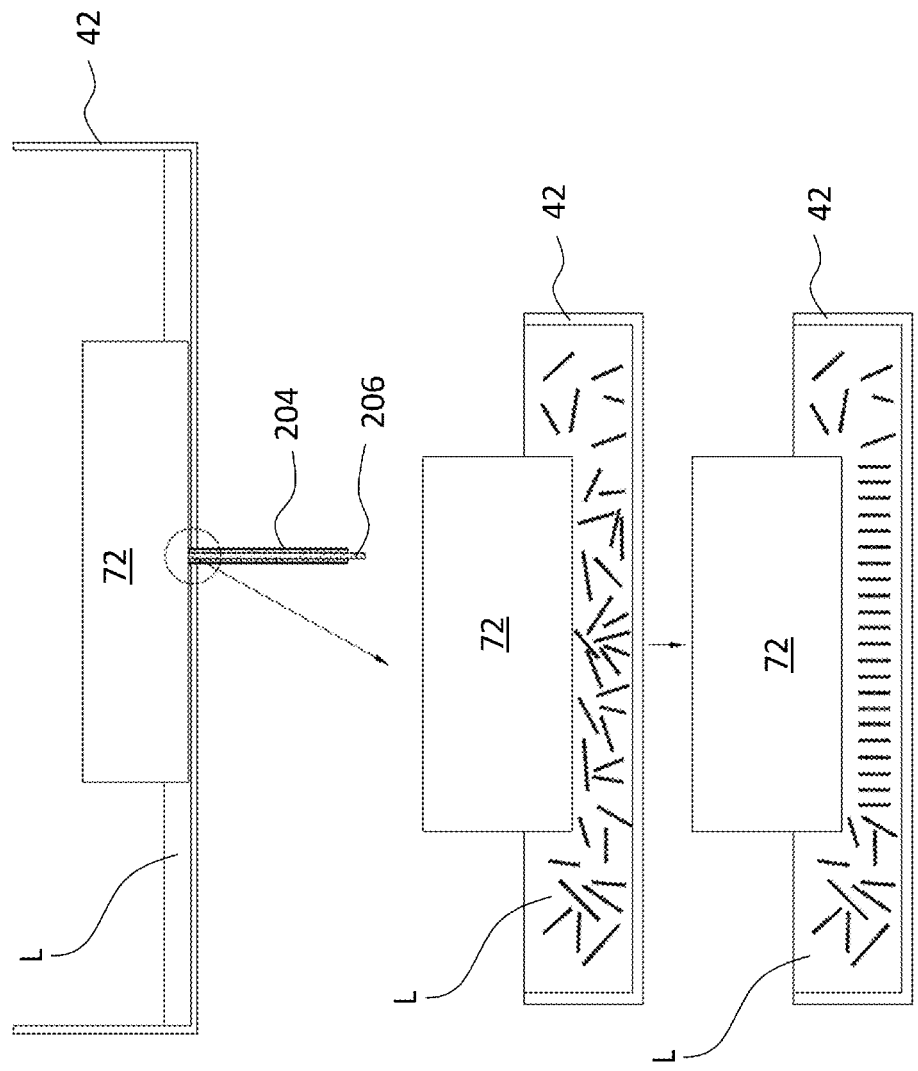
FIG. 20 shows optical trapping of a photo-curable polymer in an exemplary embodiment of an apparatus for the production of three dimensional objects by stereolithography.
Figure 21:
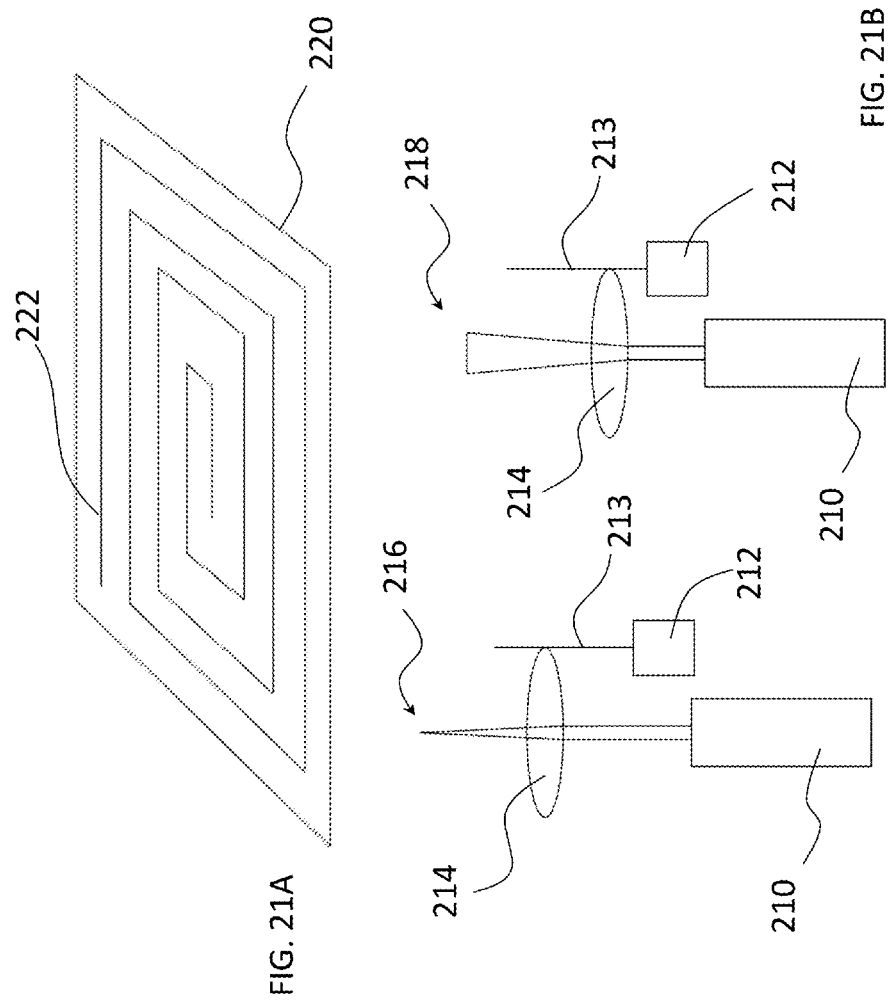
FIG. 21A shows an exemplary diagram of a print layer.
FIG. 21B shows an exemplary embodiment of a focal point adjusting lens assembly.
Figure 22:
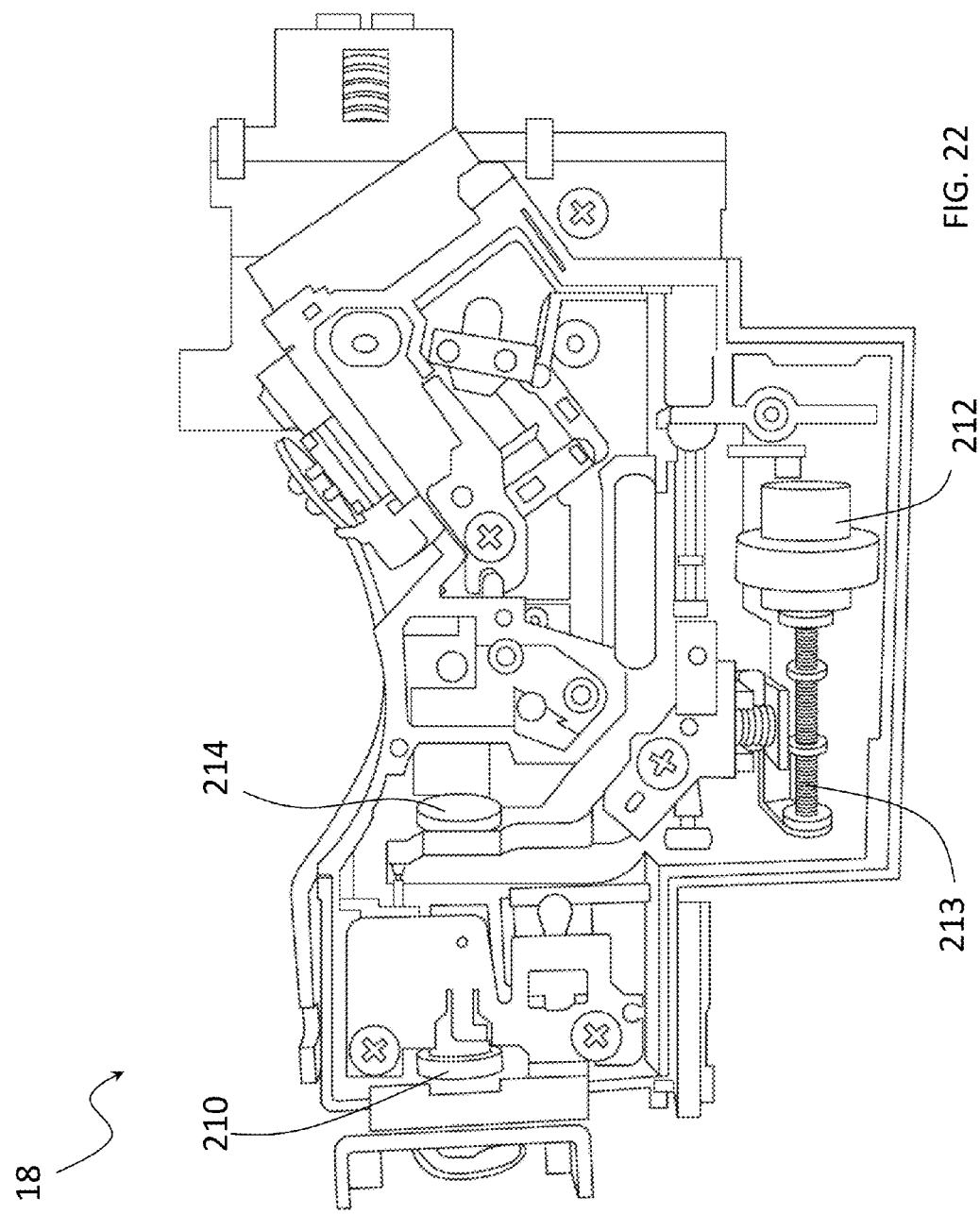
FIG. 22 shows an exemplary embodiment of a radiation source assembly.
Figure 23:
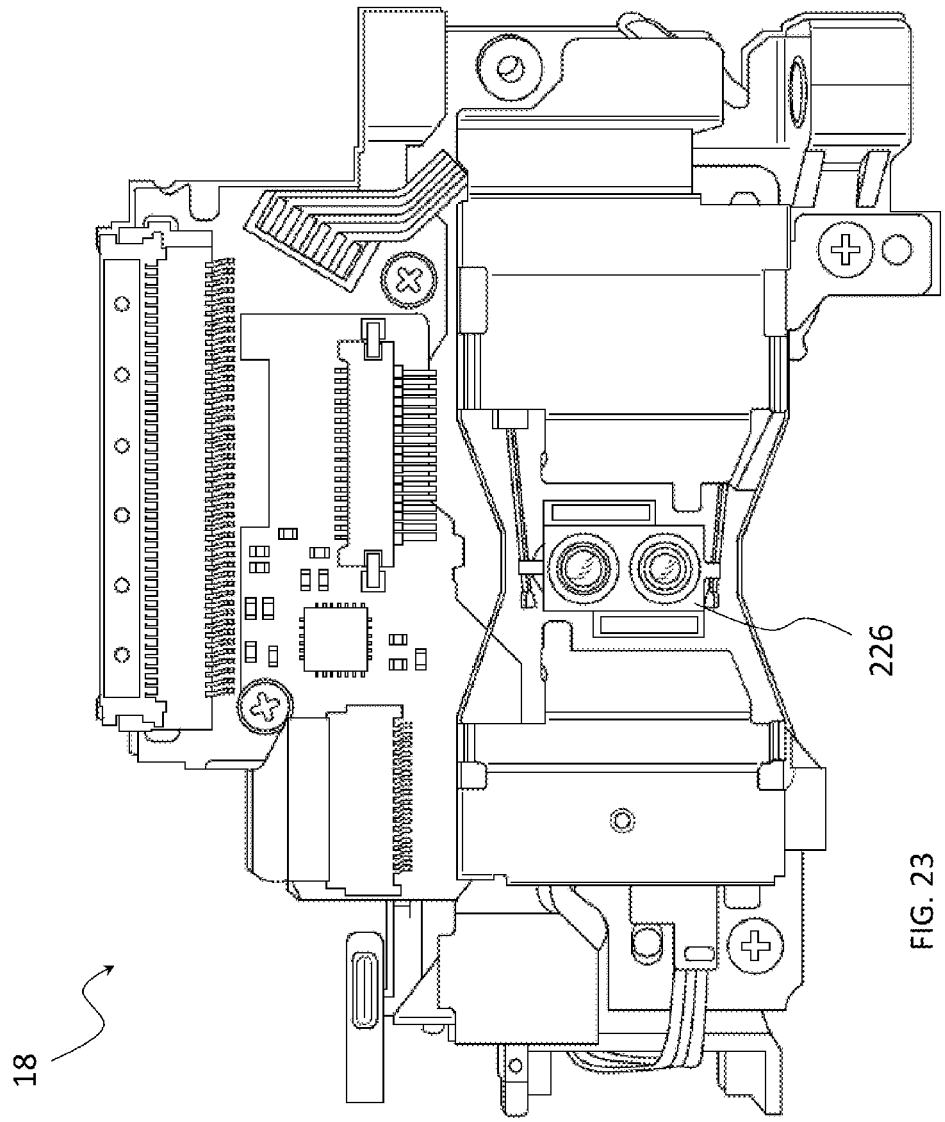
FIG. 23 shows an exemplary embodiment of a radiation source assembly.

In other exemplary embodiments, as shown in exemplary FIGS. 19-23, a radiation beam may pass through a series of lenses and filters. A laser assembly 208 may be substantially similar to that of an optical disc reader or writer. A laser diode 210 may optionally have multiple wavelength outputs. Alternatively, a laser diode 210 may have a single wavelength output. In an exemplary embodiment having multiple outputs, a laser diode 210 may output a 405 nm beam, a 605 nm beam, or a 1065 nm beam. Utilizing beams of various wavelengths may allow for curing, tracking, and optical trapping. Optical trapping, as shown in FIG. 20, may entail preparing a polymer for curing by aligning the polymer molecules. This may result in a stronger and more crystalline molecule structure when cured, subsequently yielding a higher resolution print object. In an exemplary embodiment, a polymer's molecules may respond to a 1065 nm wavelength beam 204 by aligning uniformly. A beam 206 of 405 nm, in an exemplary embodiment, may then be used to cure the aligned molecules, resulting in a crosslinking reaction with more predictability and uniformity. The print structure may consequently have a stronger and more crystalline molecule structure. Additionally, in an exemplary embodiment, a beam, such as a 605 nm beam may be used for scanning.

As demonstrated in the exemplary figures, a laser diode 210 may include a dynamic focus control for dynamically focusing a beam during printing. Dynamically adjusting beam focus may maximize beam effectiveness for different situations. For example, when printing a solid shape, an outer perimeter of the shape may require a fine focal point to create a clean, precise outline. However, to improve efficiency and speed, a wider focal point may be used to fill within the perimeter of the solid shape. The wider focal point and higher power beam may cure a larger surface area of polymer, allowing for faster infill of the shape. A laser diode may have an onboard stepper motor 212 for moving a focusing lens 214 along a lens connector 213 to adjust the beam focal point. In an exemplary embodiment, the beam focal point may broaden as lens 214 approaches a laser source 210. The focal point may be dynamically adjusted during print operations, allowing for more efficient printing. In exemplary FIG. 21, a perimeter 220 of a shape may be printed with a fine focal point 216, while the interior 224 of a shape may be printed with a wide focal point 218.

Additionally, in some exemplary embodiments, a beam 202 may project onto a photodiode 224. A photodiode 224 may facilitate beam tracking and sensing of focal errors. Monitored data may be communicated for adjustment of a collimating lens 226 by a voice coil assembly. This may allow X and Y plane alignment of the beam and it may aid in focusing the beam. An exemplary collimating lens 226 may be suspended by wire and may be magnetically controlled. In some exemplary embodiments, a laser diode may also include a camera 228 configured to monitor laser curing in real time. This may further facilitate error sensing, which may additionally be communicated for correction by adjusting a collimating lens 226.

In some embodiments, beam 202 may additionally pass through a filter 230 prior to passing through the vat bottom 46. Filter 230 may alter the intensity of beam 202. In an exemplary embodiment, the intensity of beam 202 may be lowered, but it may retain its lasing power threshold after it passes through filter 230. The filter 230 may be a neutral density optical filter and it may maintain the operating power of a laser diode, allowing low laser power output while maintaining the laser diode at a proper operating current and voltage. A power too low may not allow proper photo-initiation of the polymer. In one exemplary embodiment, a collimating lens may have a numerical aperture of approximately 0.85. A beam 202 may finally pass through vat bottom 46 and contact the curable polymer. In an exemplary embodiment, vat bottom 46 may be composed of quartz, a naturally collimating, optically transmissive material. This may further align the beam into a linear photon stream, resulting in a higher resolution print.

The following may describe an alternative exemplary embodiment of a laser radiation source. The electromagnetic beam generator may have a laser generator, which may include a laser housing. The laser housing may include a hollow cylindrical tube having a circular cross-sectional area and a first end from which a laser light beam emits. The cylindrical tube may be lined with a matte black fibrous coating which may act as a light vacuum capable of capturing stray photons from the Gaussian beam and subsequently prevent them from bombarding and affecting the beam. The coating may be a roughened inner diameter cardboard tube soaked with high heat flat black, low vapor paint. This inner wall (coating) may eliminate light reflections surrounding the collimated beam. Without this tube, these reflections may be projected into laser engines causing a halo surrounding the beam spot. In yet further alternative embodiments without an inner wall coating, a light restricting aperture may be used at the exit of the laser to set the desired spot size and "scrape" excess photons from the beam. The laser radiation source may also have a feedback loop for automatic self-tuning. The laser beam may be a collimated beam emitted from a UV laser source and may pass through a focusing lens disposed at or near an aperture at a second end of the housing. In an exemplary embodiment of the invention, the collimated beam source may have a fixed diameter of no less than 0.5 mm, and no greater than 6 mm (more particularly 2 mm). The lens may have a convex exterior surface. The focusing lens may have a back of lens focal length of between 15 mm and 37 mm (more particularly 27 mm), and a radius of curvature of between 5 mm and 20 mm (more particularly 10 mm).

The laser generator 18 may produce a laser beam that passes from the UV beam source, through the focusing lens, directly through the bottom 46 of the vat 42 and into a target voxel located inside of the vat cavity between the vat bottom 46a and, in the case of the first lamina, the work surface 72a of the build platform or, in the case of a subsequent lamina, the last previously completed lamina of the work piece. In an exemplary embodiment of the invention, the closest distance between the convex exterior surface of the laser lens and the exterior surface 46B of the vat bottom may be less than 37 mm (more particularly 32 mm). As noted above, in some exemplary embodiments, it may be desirable to have the path of the laser beam from the laser source to the target voxel be a straight line, so that the only object between the source of the laser beam and the target voxel may be the bottom of the vat. As such, in an exemplary embodiment, the distance between the laser beam and the target voxel may likewise be small, such as 40 mm or less.

In an exemplary embodiment, an electromagnetic radiation beam emitted from a focusing lens of a laser generator may have an intensity of less than 500 microwatts (more particularly 25 microwatts); and a wavelength of at least between approximately 200 and 550 nanometers. In some embodiments, the beam may have a wavelength of at least 405 nanometers. As would be understood by a person having ordinary skill in the art, various wavelengths, frequencies and intensities of radiation may be used, provided that the radiation that is imparted to the target voxel is sufficient to cure the target voxel without curing adjacent, untargeted voxels.

In some exemplary embodiment, during fabrication of each lamina, the laser beam may remain constantly "on", and the amount of laser energy to which lamina voxels are exposed may depend on the speed at which the beam passes over (or entirely bypasses) those voxels; in alternative embodiments, the laser beam may be selectively turned "off" or "on" (in response to instructions from the computer), depending on whether particular voxels are to be photocured.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for making a three-dimensional physical object comprising:
    a frame;
    a build platform coupled to the frame, wherein the build platform is movable along a z-axis and has a work surface disposed thereon;
    a vat mounted within the frame and situated so that the work surface of the build platform may be lowered within the vat, wherein the vat has sidewalls and a radiation permeable flat bottom, the vat configured to hold a photo-curable polymer;
    a radiation source, wherein the radiation source is capable of movement along an x-axis and a y-axis, wherein the radiation source is a laser and the radiation permeable flat bottom of the vat is laser transparent, the laser having a laser housing lined with roughened cardboard soaked with high heat flat black low vapor paint for reducing light reflections surrounding a collimated beam;
    at least one stepper motor for moving the radiation source, the vat, and/or the build platform;
    a power source;
    at least one data reader device or computer communication device; and
    a microcontroller in communication with the at least one stepper motor and at least one of a data reader device or computer communication device.

2. The system of claim 1, wherein the work surface of the build platform has a downwardly facing work surface and the radiation source is upwardly facing.

3. The system of claim 1, wherein the laser serving as the radiation source further comprises a laser diode configured to project at least two different wavelength beams, a dynamically adjustable focusing lens, a stepper motor for adjusting the focusing lens during operation, a photodiode configured to measure and communicate beam characteristics, a suspended collimating lens configured to adjust beam characteristics based on data communicated by the photodiode, a filter configured to affect beam intensity, and a camera for monitoring a curing process.

4. The system of claim 1, further comprising at least one window disposed within at least one exterior panel, wherein the at least one window will not allow UV or low visible light between 200 to 550 nm to leak through and activate the photo-curable polymer.

5. The system of claim 1, wherein the vat or a vat mounting assembly is horizontally hinged to the frame at a first end of the vat or vat mounting assembly and is connected to or in contact with a vat stepper motor or a connector thereof at a second end, so as to allow the vat or vat mounting assembly with a vat therein to rotate about the hinged first end.

6. The system of claim 1 further comprising 4 stepper motors, wherein one moves an x rail along a y-axis, a second moves a radiation source along an x-axis on a x rail, a third moves the build platform along a z-axis, and a fourth moves a vat mounting assembly.

7. The system of claim 1 wherein the photo-curable polymer is polyethylene diacrylate 200.

8. The system of claim 1 wherein the distance between the radiation source and a target voxel is 40 mm or less.

9. The system of claim 1 wherein a radiation intensity of radiation emitted from a focusing lens of the laser serving as the radiation source is less than 500 microwatts and a wavelength of the radiation is greater than 200 nanometers and less than 550 nanometers.

10. The system of claim 1 wherein the radiation permeable flat bottom of the vat is quartz.

11. The system of claim 1 further comprising a GPU hardware accelerator in communication with the computer and microcontroller.

12. A method for making three-dimensional physical objects comprising:
    providing a system for making three-dimensional physical objects having:
        a frame,
        a build platform coupled to the frame, wherein the build platform is movable along a Z axis and has a work surface disposed thereon,
        a vat mounted within the frame and situated so that the work surface of the build platform may be lowered within the vat, wherein the vat has sidewalls and a radiation permeable flat bottom, the vat configured to hold a photo-curable polymer,
        a radiation source, wherein the radiation source is capable of movement along an x-axis and a y-axis, wherein the radiation source is a laser and the radiation permeable flat bottom of the vat is laser transparent, the laser having a laser housing lined with roughened cardboard soaked with high heat flat black low vapor paint for reducing light reflections surrounding a collimated beam,
        at least one stepper motor for moving the radiation source, the vat, and/or the build platform,
        a power source,
        at least one data reader device or computer communication device, and
        a microcontroller in communication with the at least one stepper motor and at least one of a data reader device or computer communication device;
    filling the vat with a photo-curable polymer;
    providing a three dimensional drawing file to the data reader or computer; and
    with the system, communicating the file data to the microcontroller and subsequently controlling the stepper motors and radiation source to cure the photocurable polymer and form an object in accordance with the data file.

13. The method of claim 12, further comprising using a GPU hardware accelerator to process the data file.

14. The method of claim 12, wherein the photocurable polymer is polyethylene diacrylate 200.

15. The method of claim 12 wherein the distance between the radiation source and a target voxel is 40 mm or less.

16. The method of claim 12 wherein a radiation intensity of radiation emitted from a focusing lens of the laser serving as the radiation source is less than 500 microwatts and a wavelength of the radiation is greater than 200 nanometers and less than 550 nanometers.

17. The method of claim 12, further comprising providing a vat stepper motor for tilting the vat away from a work surface to peel a completed work layer from the vat bottom and subsequently returning the vat to a horizontal orientation after the work surface has been raised a distance of one work layer along a Z-axis.

18. The method of claim 12, further comprising optically trapping the photo-curable polymer using a beam having a different wavelength from a curing beam, prior to curing the photo-curable polymer with the curing beam.

\* \* \* \* \*